United States Patent [19]
Knox

[11] Patent Number: 5,646,744
[45] Date of Patent: Jul. 8, 1997

[54] SHOW-THROUGH CORRECTION FOR TWO-SIDED DOCUMENTS

[75] Inventor: Keith T. Knox, Rochester, N.Y.

[73] Assignee: Xerox Corporation, Stamford, Conn.

[21] Appl. No.: 584,792

[22] Filed: Jan. 11, 1996

[51] Int. Cl.⁶ .............................. H04N 1/23; H04N 1/38; H04N 1/387

[52] U.S. Cl. ...................... 358/401; 358/448; 358/464

[58] Field of Search ...................... 358/401, 448, 358/464, 300, 296, 486, 474, 494, 471, 496; 382/275; 355/214, 23, 24

[56] References Cited

U.S. PATENT DOCUMENTS

| | | |
|---|---|---|
| 4,604,161 | 8/1986 | Araghi . |
| 4,673,285 | 6/1987 | Shogren ................................ 355/23 |
| 4,734,742 | 3/1988 | Klumpp et al. ........................ 355/23 |
| 4,743,974 | 5/1988 | Lockwood ............................. 358/494 |
| 4,967,233 | 10/1990 | Buchar et al. ........................ 358/496 |
| 5,053,818 | 10/1991 | Smith ................................... 355/214 |

*Primary Examiner*—Scott A. Rogers
*Attorney, Agent, or Firm*—Mark Costello

[57] ABSTRACT

An image processing method for mitigating the effects of show-through in scanning a duplexed document in a duplex scanning system, including: deriving a scanned first side image P from a first side image A of a duplexed document and a scanned second side image Q from a second side image B of the duplexed document, at least the first side image P including a component thereof attributable to show-through from the second side of the document, and storing images P and Q; from second side image Q, generating a representation thereof corresponding to the show-through contribution to first side image P; processing image P to remove show-through as a function of the representation Q, thereby deriving correct image A.

22 Claims, 6 Drawing Sheets

SHOW-THROUGH CORRECTION FOR TWO-SIDED DOCUMENTS

FIELD OF THE INVENTION

The present invention is directed to the reduction or removal of image defects attributable to show-through in two sided image scanning process.

BACKGROUND OF THE INVENTION

Acquisition of information adaptable for electronic processing applications directly from printed original documents has become greatly desirable as an adjunct to electronic document production. An important reason for its desirability is the subsequent capability of manipulation of the electronically stored information for editing, compiling and using the information in forms other that that in which it was originally available. Accordingly, it is desirable to have an image information input capability for such information. In addition to the production of new documents from electronically stored information, it will also be appreciated that some copying functions available in light lens-type copiers, copying images directly from original documents, may be more readily accomplished if image information is available electronically. Thus, with the capability of electronic input of information, coupled with available output devices, functions such as duplex copying, image rotation, cropping, editing, etc, are possible without the requirement of difficult mechanical manipulation of originals and copies.

In duplex scanning, the scan of one side of a typical two-sided piece of translucent paper will contain information from both sides of the page. The high contrast information of the front side will be combined with a low contrast version of the image from the back side of the page. This low contrast information from the back side of the page is called "show-through".

One method for mechanically reducing show-through is to place a black page on the back side of the page while scanning. The light that goes through the page is absorbed by the black backing and, although there is a significant reduction of the show-through by this method, there is a small residual low contrast image of the back side remaining in the scanned image due to light scattering off the back side of the paper.

There are circumstances for which it is not possible to mechanically remove show-through. One is when both sides of the page are scanned simultaneously. In this case, both sides of the page are illuminated and imaged at the same time. Under these conditions, the information on each side will show through to the opposite side. Another circumstance is when a post-scanning correction for show-through is needed for an image scanned on a scanner with a white cover.

The problem of show-through has sometimes been addressed mechanically, as in U.S. Pat. No. 4,743,974 to Lockwood, which shows simultaneous duplex scanning of duplexed documents, with sensors that are slightly offset. The close placement of sensors for simultaneous duplex scanning is desirable for space consideration reasons.

With only the scanned image from one side, there is no way of distinguishing between the low contrast "show-through" information from the back side and the low contrast information from the front side of the page. Additional information is needed to be able to distinguish between the two types of low contrast information.

References described hereinabove and below are hereby incorporated by reference for their teachings

SUMMARY OF THE INVENTION

In accordance with the invention, an image processing method is described in which a document is processed for the removal of second side show-through, for the improvement of image appearance.

In accordance with one aspect of the invention, there is provided an image processing method for mitigating the effects of show-through in scanning a duplexed document in a duplex scanning system, including: deriving a scanned first side image P from a first side image A of a duplexed document and a scanned second side image Q from a second side image B of the duplexed document, at least the first side image P including a component thereof attributable to show-through from the second side of the document, and storing images P and Q; from second side image Q, generating a representation thereof corresponding to the show-through contribution to first side image P; processing image P to remove show-through as a function of the representation Q, thereby deriving correct image A.

In accordance with another aspect of the invention, a representation of Q is generated by reverse reading image Q and translating image Q in terms of spatial coordinates required to bring each pixel of image Q to a position corresponding to the contribution thereof to image P.

With only the scanned image from one side, there is no way of distinguishing between the low contrast "show-through" information from the back side and the low contrast information from the front side of the page. Additional information is needed to be able to distinguish between the two types of low contrast information. By scanning both sides of the page, it is possible obtain the extra information needed. Thus, show-through can be substantially reduced by removing image components in the scanned image attributable to show-through, by 1) knowing the image content of both first and second sides of the page, 2) knowing the relative alignment of the first and second side image content, and 3) identifying low contrast image portions in the scanned image attributable only to second side image content.

In this manner, images can be automatically cleaned of show-through with minimal operator intervention, and minimal image impact.

These and other aspects of the invention will become apparent from the following descriptions to illustrate a preferred embodiment of the invention read in conjunction with the accompanying drawings in which.

DETAILED DESCRIPTION OF THE INVENTION

Figure 1:
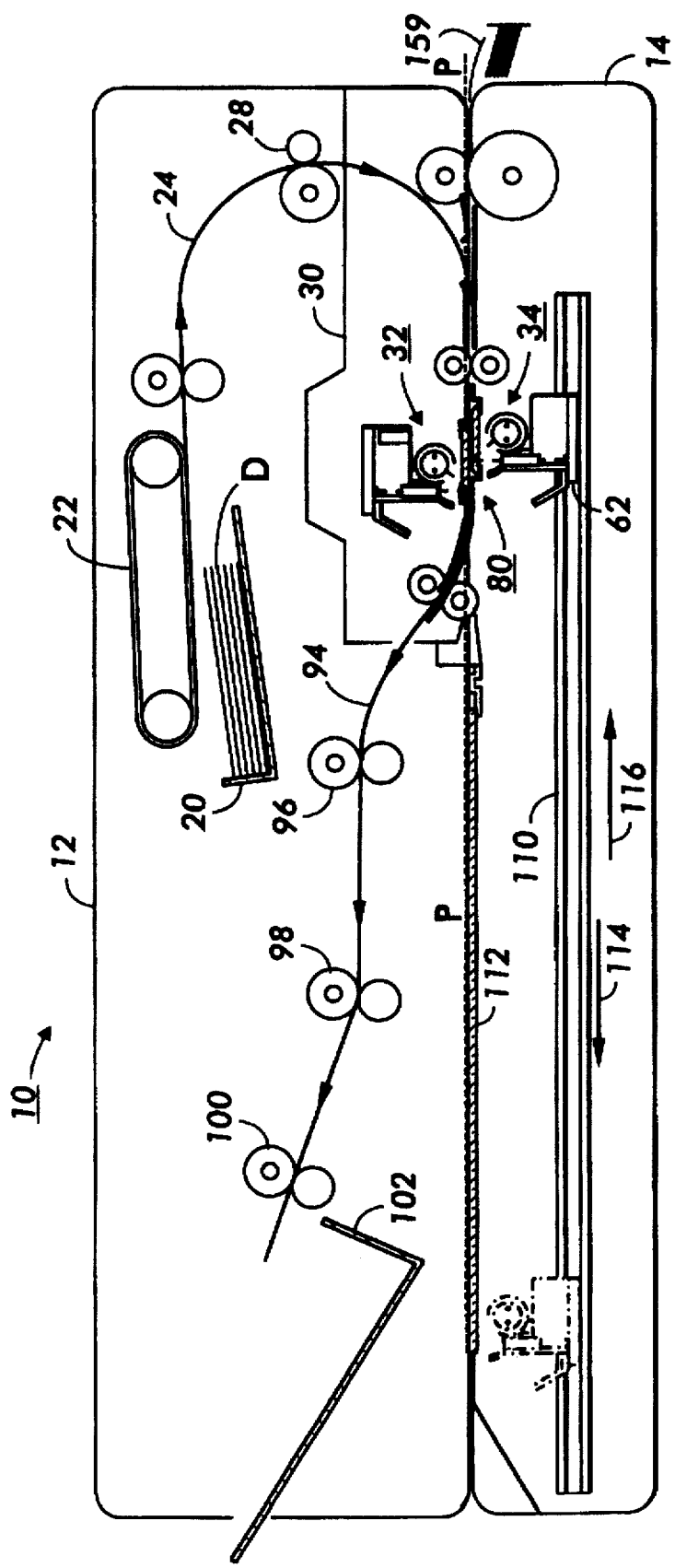
FIG. 1 shows a duplex scanner.

Referring now to the drawings where the showings are for the purpose of illustrating a preferred embodiment of the invention, and not for limiting same, FIG. 1 shows a raster input scanner 10 in accordance with the invention for generating an electronic representation of an image on a document. As used hereinafter, "document" refers to an image bearing original from which copying is desired. Documents may comprise image supporting substrates, such as cut sheets of paper, transparencies or other individual pieces of flimsy material, unburst computer forms forming a continuous length of material, or any image bearing substrate from which copying is desired. When necessary, the type of document for which the description finds use will be described with greater particularity. For this invention, we are primarily concerned with "duplex" documents, i.e., original documents with images on both faces thereof. "Image" as used herein refers to the information on the document, for which scanning is desired, and which will be in some manner copied to another substrate or to an electronic storage medium. "Scanning" as used hereinafter, refers to the relative movement of photosensitive sensors with respect to documents for the purpose of acquiring an electronic representation of the image or information about the image.

Reference is made to U.S. Pat. No. 4,743,974 to Lockwood, and U.S. Pat. No. 4,967,233 to Buchar et al., which describe an example duplex image scanner in which the invention would find use. Similar problems would be noted in the arrangements described in U.S. Pat. No. 4,673,285 to Shogren, U.S. Pat No. 4,734,742 to Klumpp et al. Show-through can be a problem in any scanner. However, processing can be simplified if second side image acquisition can occur substantially close in time to first side image acquisition, as will become apparent.

Raster input scanner 10 may be comprised of upper and lower frame members 12 and 14. Upper frame member 12 is provided with a document input tray 20 for holding a stack of documents D such as cut sheets of paper face-up in the document tray from which data acquisition is desired. Document input tray 20 is provided with a document feeder 22 for feeding documents D out from document input tray 20. In a preferred embodiment of the invention, document feeder 22 may be a well-known top feeding vacuum corrugated feeder found in standard document feeders for light-lens type copiers for feeding documents in a 1-N order. Document input tray 20 may also be upwardly biased or provided with a tray elevator (not shown) to provide documents D in position for feeding.

Documents D are directed by document feeder 22 to an input sheet path 24 to be directed to a scanning position. Along sheet path 24, documents D are driven along by nip roll 26, comprising a pair of rubber rollers which drive the documents in a forward direction along the sheet path 24. A second nip roll 28 may advantageously comprise a cross roll deskewing nip to provide documents in a desired registered position before entering the scanning station. A drive motor (not shown) is provided for driving the document feeder, and drive rollers in the nips, as well as the other driving elements of raster input scanner 10.

Documents 10 are driven along input sheet path 24 into scanning station 30. Best viewed at FIGS. 2 and 3, and in accordance with the invention, scanning station 30 is comprised of upper and lower scanning elements 32 and 34. Upper scanning element 32 is fixed in position with respect to sheet path 24, and comprises an upper scanning element frame generally indicated as 36. As better shown in FIG. 3, frame 36 extends transversely across and above the path of document travel, for the support of the scanning array for scanning a document passing thereunder. Referring again to FIGS. 2 and 3, on an upper portion of frame 36, scanning array 38 is supported on scanning array support member 40, transverse to the path of sheet travel thereby for scanning documents. Scanning array support member 40 is a relatively rigid member fixed to the frame 36 by a fastening arrangement, and supporting scanning array 38 in position across the path of document travel, without sagging or twisting which could cause imaging imperfections. Scanning array 38 may be a linear array of photosensitive sensors such as CCD's or photodiodes which are controlled to sense light reflected from a document during an integration period. The photosensitive sensors develop a charge indicative of the amount of light detected, for transmission to an image processor for use in assimilating an electronically stored representation of the image on the document. In a preferred embodiment of the invention, the array may comprise several smaller arrays butted at their ends to each other to form an unbroken array, as described in U.S. Pat. No. 4,604,161 to Araghi. Other types of sensors are well within the contemplation of the invention.

Documents directed past scanning element 32 are illuminated by a lamp assembly supported on frame 36 and comprising lamp 42, and lamp cover 44 having aperture 45 engaged to a power supply (not shown) and directing light towards the document to be scanned. Light from the illuminated document is reflected to lens 46, comprising a bundle of image transmitting fiber lenses produced under the tradename of SELFOC by Nippon Sheet Glass Company Limited, provided to direct light reflected from the document to scanning array 38. Adjacent to the portion of lens 46 closest to the document is a frame extension member 48, extending generally towards the document which may be advantageously provided with a light reflecting concave surface 50 to further aid in directing light from lamp 42 to illuminate the document. It will, of course, be appreciated that other optical and illuminating systems may be used to illuminate and direct light from the document to the scanning array 38.

Referring again to FIG. 2, lower scanning element 34 is provided as a mirror image of scanning element 32, including a frame 60, scanning array support member 62, scanning array 64, lamp assembly including lamp 66 and lamp cover 68 having aperture 69, lens 70 and frame extension member 72 having a reflective surface 74. The primary difference between the two scanning elements is that the lower scanning element 34 is arranged in a position opposing that of upper scanning element 32, in order to scan images on a side of the document opposite to that scanned by the upper scanning element 34. Accordingly, as viewed in FIGS. 2 and 3, images on the upper face of documents, passing through the scanning station 30 are illuminated and scanned by upper scanning element 32, while images on the lower face of the document are illuminated and scanned by the lower scanning element 34. In practice, it is preferable to have the elements slightly offset from one another so that the illumination provided for scanning one side of the document does not cause shadows detectable by the sensors in the scanning arrays to show-through the documents. However, the problem of show-through still exists.

Documents entering the scanning station are driven into and through the station by a four roll Controlled Velocity Transport (CVT) arrangement 80 comprising two sets of nip roll pairs 82 and 84 located at the entry and exit to the scanning station, respectively. Each nip roll pair is comprised of an upper drive roll 82a and 84a and a lower idler roll 82b and 84b. Drive rolls 82a and 84a are driven by a motor (not shown) which maintains the speed of the rolls and accordingly, the speed of documents moved by the rolls at a carefully controlled constant velocity. The rollers comprising the CVT may be supported separately from the scanning stations at respective positions on the upper and lower frame portions.

Figure 2:
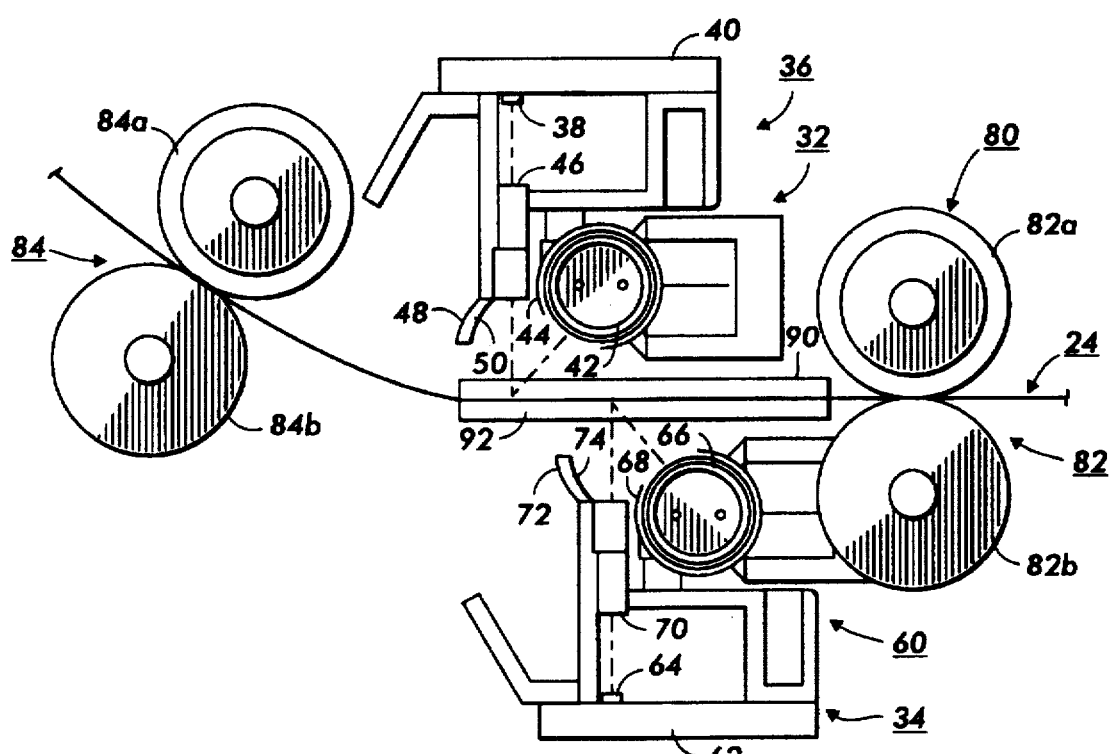
FIGS. 2 and 3 show a duplex scanning assembly.
Figure 3:
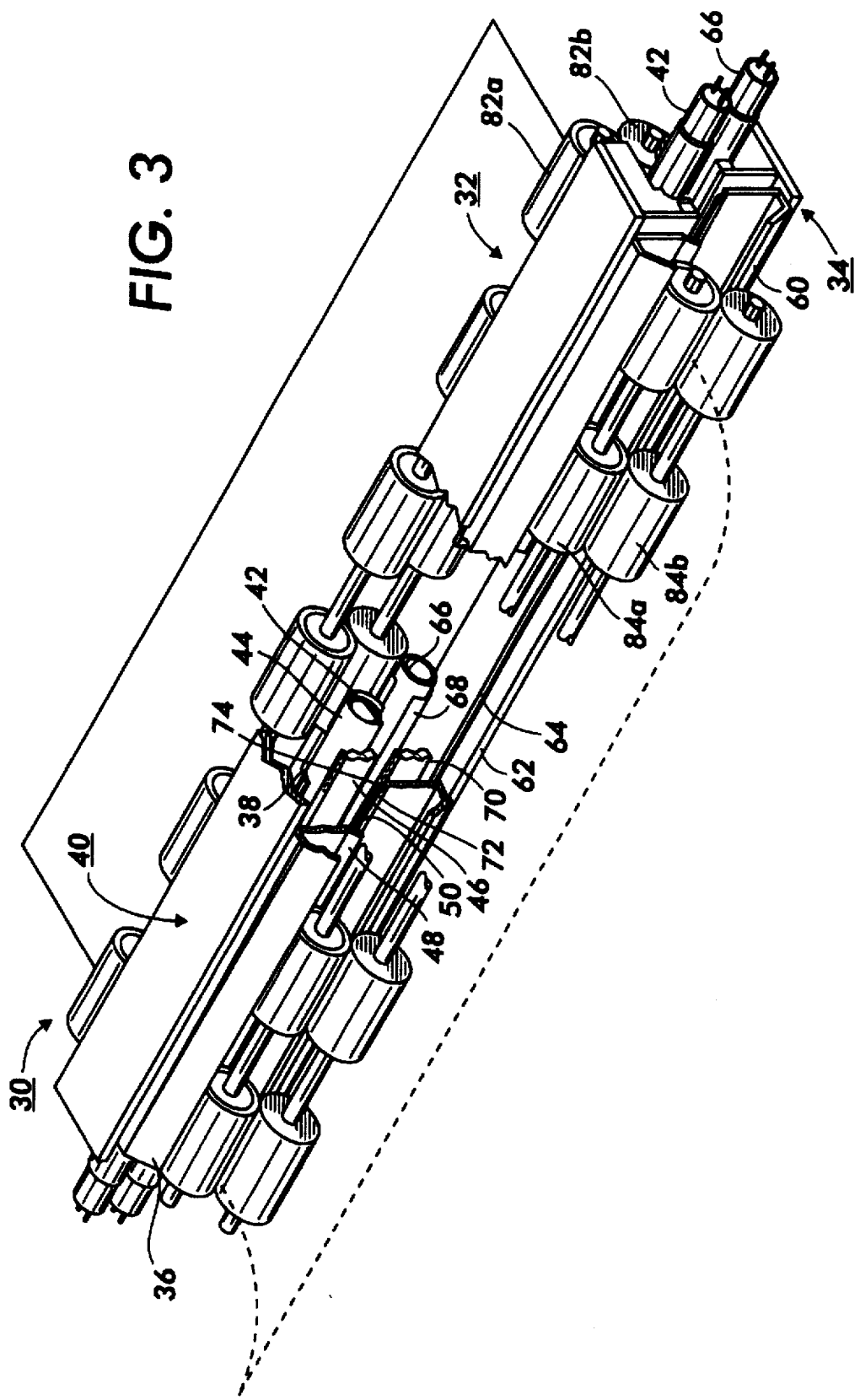

With reference to FIGS. 1 and 2, sheets transported through scanning station 32 are directed between platen glass members 90 and 92 supported respectively on upper and lower frame members 12 and 14 which serve to maintain flatness in documents advancing therethrough for scanning.

As documents are advanced through scanning station 30, photosensitive sensors on scanning arrays 38 and 64 derive an electronic representation of the image thereon for transmission to an image processing or storage device.

With reference again to FIG. 1, upon leaving the scanning station 32, documents are driven by CVT 80 to an exit sheet path 94 wherealong documents are driven by nip roll pairs 96, 98 and 100 into an output tray 102. The passage of documents along the described sheet path, having a generally U-shape, with a single fold, and feeding the documents in the input tray 20 from the top of the input stack, provides a single natural inversion of the documents, so that they are arranged face down in output tray 102 in the same order that they were originally provided.

Control of the described arrangement may be accomplished in a variety of ways, depending on the planned usage of the device. Feeding of documents, control of sheets directed through the sheet path operation during the desired modes of operation, including movement of the scanning element 34 in its scanning motion across the platen may be controlled by an on-board microprocessor of the type commonly used in the control of light lens copiers, or prior raster scanners and tailored to the application required by the present device. Control of the imaging assembly may also be an on-board microprocessor device which repeatedly polls the sensors of sensor arrays 38 and 64 to derive charge information indicative of the image on documents scanned thereby, assigns the derived data with address information and provides the addressed information as an output. The control of the device is responsive to operator information input. Alternatively, the described device may be partially or completely controlled by another device, such as for example, a computer, a local or remote workstation or compatible printer.

Figure 4:
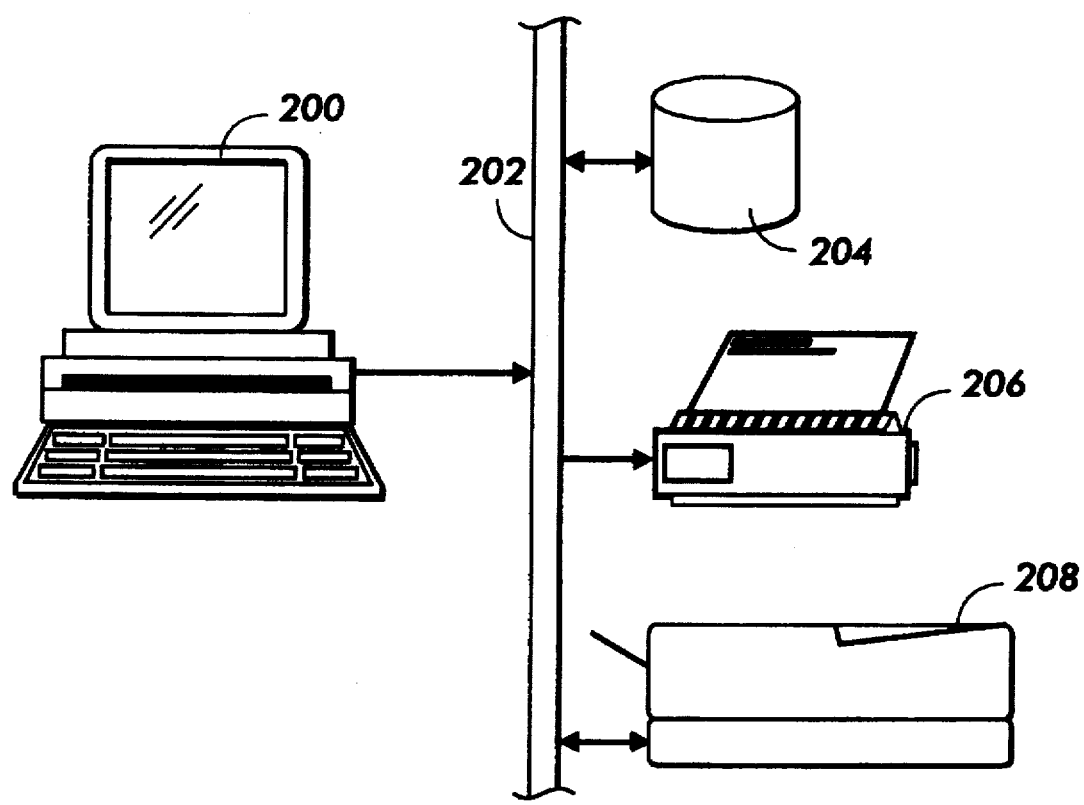
FIG. 4 shows a document processing system in which the present invention might be implemented.

FIG. 4 shows a computer workstation 200, connected via a network connection 202 to a text and graphics document storage device 204. The processing steps that will be described herein may take place either on the workstation, or at a server or processor associated with storage device 204. The computer workstation may be associated with a printing system 206 for reproduction of documents in hard copy. The computer workstation may also be associated with the scanning system 208 (as previously described). As another alternative, the processing described may take place within the scanner itself, if the scanner is equipped with the appropriate processors. This may well be the case in the situation of a digital copier, which is equivalent to the computer/scanner/printer combination described herein.

Figure 5A:
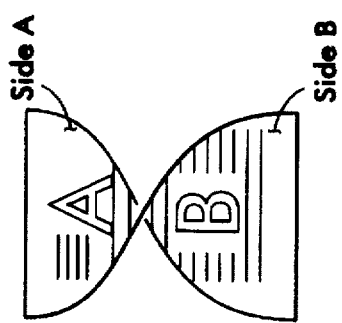
FIGS. 5A–5E show a step-by-step illustration of the image as the invention operates on it.

With reference now to FIGS. 5A–E, we follow the process step by step. FIG. 5A illustrates the two sided document which the present invention is concerned with, which may have show-through defects.

Figure 5B:
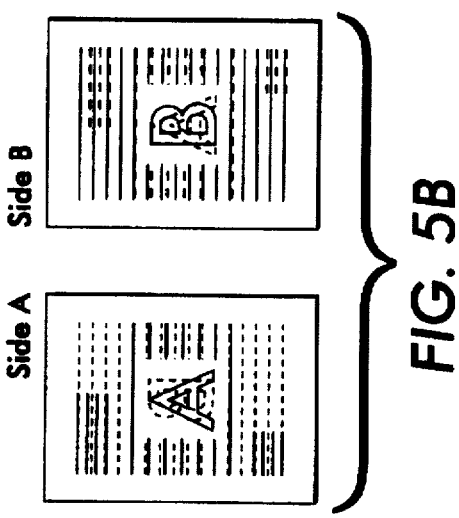

FIG. 5B illustrates the results of scanning the document. With only the scanned image from one side, there would be no way of distinguishing between the low contrast "show-through" information from the back side and the low contrast information from the front side of the page. Additional information is needed to be able to distinguish between the two types of low contrast information. By scanning both sides of the page, it is possible obtain the extra information needed.

In accordance with the invention, once both sides of an image have been acquired, show-through mitigation may occur. While the present invention is illustrated implemented with a duplex scanner, it will be apparent that the invention could be implemented with a single sensor array, in a system which provides a second pass of the document past the sensor array. Another arrangement might include a high quality sensor array and a low quality sensor array, where information from the low quality sensor array is used for acquiring the second side image. In yet another arrangement, the output of a simplex-only scanner can be processed for show-through mitigation, using two passes of each document through the scanner to derive the required first and second side image information.

Figure 5C:
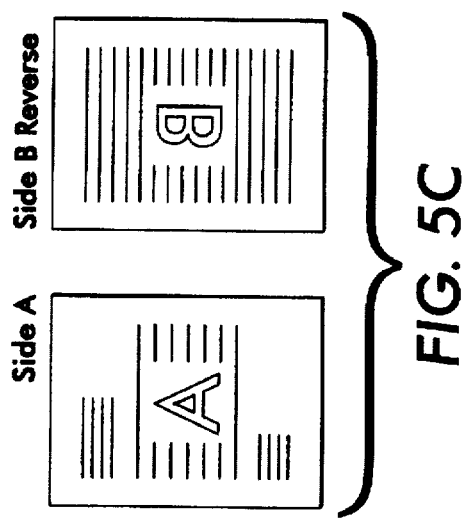

With reference now to FIG. 5C, in performing a show-through mitigation, it is important to notice is that the low contrast show-through information will be reversed, left-to-right, from the high contrast information of the other side. Therefore, when comparing the high contrast and low contrast information from the two sides, it is necessary to reverse one of the images.

Figure 5D:
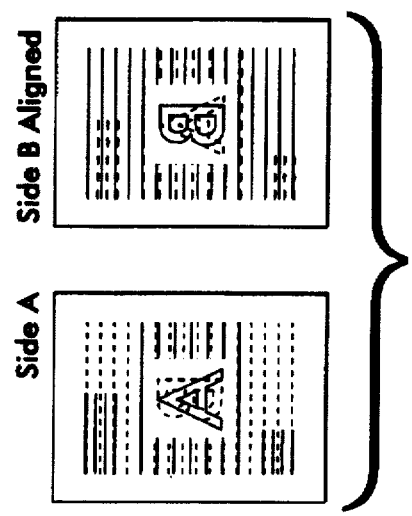
Figure 5E:
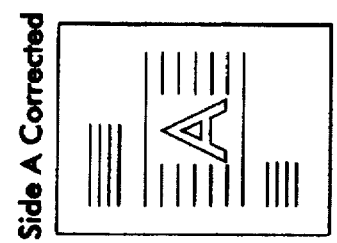

With reference to FIG. 5D, the next requirement is to align the high contrast and low contrast images. Because the images are acquired at different times, or at different sensors, they are not scanned with the same spatial reference. Skew alignment, lateral shifts and linear distortions of the image all may be required. For the simultaneous scan case, these corrections can be determined from the geometry of the scanner, or by a calibration process, which scans a test target, and notes the spatial displacement of target features. For the case of a software correction of an arbitrary scanner output, some human guidance to the correction algorithm may be required.

At this point in the process, a pixel location on side A can be identified as potentially having a contribution to its value from side B, due to knowledge of the location of the image on side B.

Accordingly, low contrast information will be removed from areas of a first image, corresponding to show-through from the second image. Initially it is noted that the show-through image is relatively low contrast in nature, mixed in with a high contrast main image. An example document has two sides, A and B. After 1) reverse reading the image into a buffer, and 2) aligning each image, the document has been processed so that each pixel location on side A or B corresponds to the both the front side or correct image A or B, and the show-through reversed image B or A, respectively. In this condition, the document is ready for show through mitigation.

Models are available which describe the resulting image: the resulting scanned images P and Q might be expressed as:

$$P(x)=(A(x)+fB(-x))/(1+f) \qquad (1)$$

$$Q=(fA(-x)+B(x))/(1+f) \qquad (2)$$

where f is a constant describing the contrast level of the show-through portion of the image.

The true images, A and B, are therefore given by:

$$A(x)=(P(x)-fQ(-x))/(1-f) \qquad (3)$$

$$B(x)=(Q(x)-fP(-x))/(1-f) \qquad (4)$$

Accordingly, each pixel in A or B can be modified appropriately, to derive corrected side A or B with minimal impact on the image A or B respectively.

This correction uses a linear model. Other embodiments of the mixing model are possible. For example, the model could include a blur function on the information from the back side. The model could also include non-linear combinations of the two images. In such cases, the correction formulae, in equations 3 and 4, would be different from those shown here.

In practice, each pixel in scanned image P or Q is then modified through a logic arrangement implementing equations 3 and 4 to derive a true image, A or B, respectively.

Figure 6A:
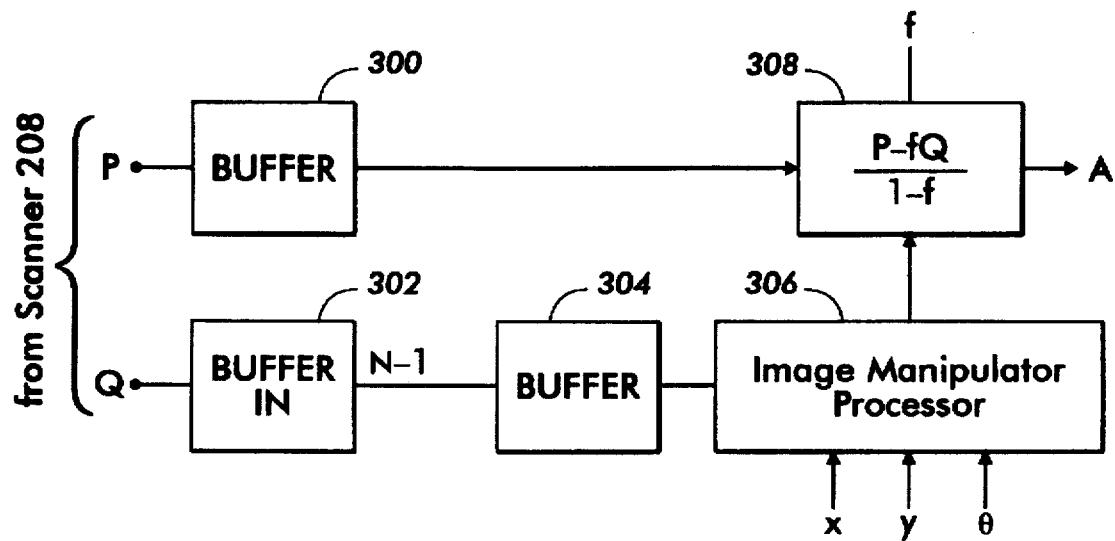
FIGS. 6A and 6B are a functional block diagram of a system implementing the invention.
Figure 6B:
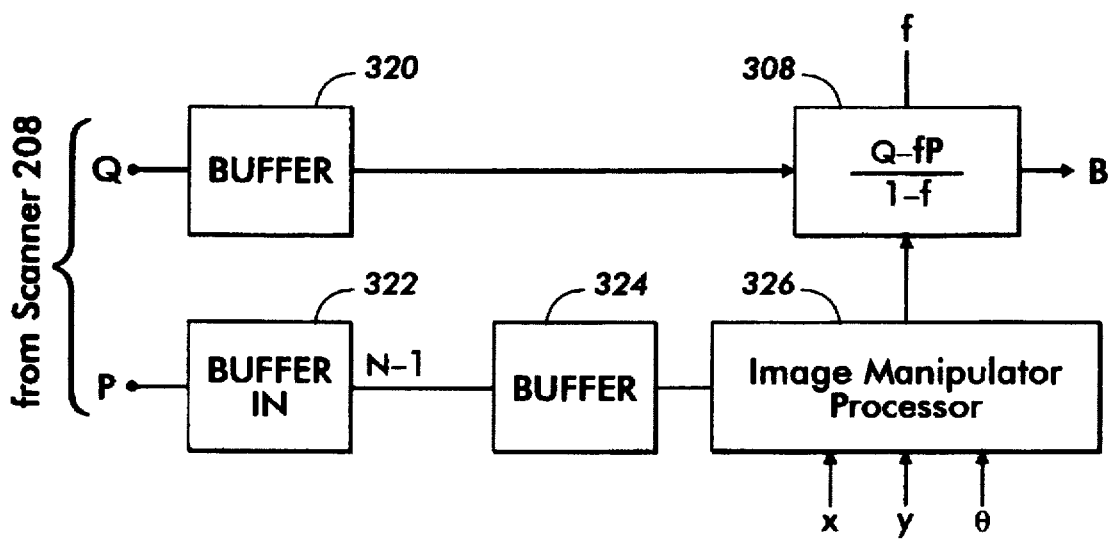

FIGS. 6A and 6B illustrate a functional block diagram showing one possible embodiment of the process described. Referring initially to FIG. 6A, initially, scanned images P (which is the scanned combination of the side A image and the show-through contribution of side B) and scanned image Q (the scanned combination of the side B image, and the show-through contribution of side A, which for mitigation purposes is considered minimal) are scanned and buffered at memory device 300 and 302 respectively. Data describing scanned image Q is initially stored at buffer 302 in a standard 1-N format. It is however, rewritten to buffer 304 in an N-1 format, to reverse read the image. Next, the scanned image Q data is translated to accomplish spatial correction at image manipulation processor 306 by an amount determined in a calibration process, in terms of x, y and θ position, so that each pixel of scanned image Q approximately correspond to the position of its effect on scanned image P. The reverse read and aligned image is subsequently processed in accordance with equation 3, to remove from scanned image P a component of the image attributable to show-through.

FIG. 6B is substantially similar to FIG. 6A, with buffer 320 receiving scanned image Q, buffer 322 receiving scanned image P, buffer 324 receiving the reverse read version of scanned image P, and image manipulation processor 326 spatially translating scanned image P by an amount required to bring it into alignment with scanned image Q. Equation 4 is applied to scanned images P and Q for the derivation of true image B from derived scanned images P and Q.

The described equations can be applied to each pixel either by circuitry or software programmed for accomplishing the mathematical calculation, or more likely, with a look-up table, loaded with likely corrections for a given set of materials and conditions.

The calibration used at image manipulation processors 306, 326 can be either entered by a user on an image by image basis, or derived an inserted automatically with a calibration process that scans a test target and locates a target feature with respect to each scanning position. Likewise, a value of the show-through coefficient f can be entered on a trial and error basis with a user observing the results or by measuring show-through based on known imaging parameters.

Different types of paper will have different amounts of show-through. The type of marking, i.e. toner, ink, pen, etc., may also influence the amount of show-through. These different values will not be radically different for normal plain paper. If necessary, a manual adjustment to the amount of show-through correction, i.e. the value of "f", could be provided to allow the operator to maximize the correction.

The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

I claim:

1. An image processing method for mitigating the effects of show-through in scanning a duplexed document in a duplex scanning system, including:

deriving a scanned first side image P from a first side image A of a duplexed document and a scanned second side image Q from a second side image B of the duplexed document, at least the first side image P including a component thereof attributable to show-through from the second side of the document, and storing images P and Q;

from second side image Q, generating a representation thereof corresponding to the show-through contribution to first side image P;

processing image P to remove show-through as a function of the representation Q, thereby deriving correct image A.

2. The image processing method of claim 1, wherein the representation of Q is generated by reverse reading image Q.

3. The image processing method of claim 1, wherein the representation of Q is generated by translating image Q in terms of spatial coordinates to bring each pixel of image Q to a position corresponding to the contribution thereof to image P.

4. The image processing method of claim 1, wherein the representation of Q is generated by:

reverse reading image Q;

translating reverse read image Q in terms of spatial coordinates required to bring each pixel of image Q to a position corresponding to the contribution thereof to image P.

5. The image processing method described in claim 1, wherein said image P is additionally a function of a show through coefficient f, indicating the intensity of the show through portion of the image.

6. The image processing method of claim 5, wherein the processing function is given by $$A(x)=(P(x)-(f \times Q(-x)))/(1-f).$$

7. An image processing arrangement for mitigating the effects of show-through in scanning a duplexed document in a duplex scanning system, including:

a scanner deriving a scanned first side image P from a first side image A of a duplexed document and a scanned second side image Q from a second side image B of the duplexed document, at least the first side image P including a component thereof attributable to show-through from the second side of the document, and storing images P and Q;

an image manipulation circuit generating a representation of Q corresponding to the show-through contribution to first side image P;

means for processing image P to remove show-through as a function of the representation Q, thereby deriving correct image A.

8. The image processing arrangement of claim 7, wherein said image manipulation circuit for generating the representation of Q includes means for reverse reading image Q.

9. The image processing method arrangement of claim 7, wherein the image manipulation circuit generating a representation of Q included means for translating image Q in terms of spatial coordinates to bring each pixel of image Q to a position corresponding to the contribution thereof to image P.

10. The image processing arrangement of claim 7, wherein the image manipulation circuit generating a representation of Q includes:

means for reverse reading image Q; and means for translating reverse read image Q in terms of spatial coordinates required to bring each pixel of image Q to a position corresponding to the contribution thereof to image P.

11. The image processing arrangement described in claim 7, wherein means for processing image P additionally takes into account a function of a show through coefficient f, indicating the intensity of the show through portion of the image.

12. The image processing arrangement of claim 11, wherein the processing means operates in accordance with the function given by $$A(x)=(P(x)-(f\times Q(-x)))/(1-f).$$

13. An image processing method for mitigation the effects of show-through in scanning duplexed documents in a duplex scanning systems, including:

scanning a first side image A of a document to acquire an image P including show-through effects of a second side image B;

scanning the second side image B of a document to acquire an image Q including the show-through effects of a first side image A;

processing image P for removal of show-through effects, by:
generating a representation of Q corresponding to the show-through contribution to first side image P,
processing image P to remove show-through as a function of the representation Q, thereby deriving correct image A;

processing image Q for removal of show-through effects, by:
generating a representation of P corresponding to the show-through contribution to second side image Q,
processing image Q to remove show-through as a function of the representation P, thereby deriving correct image B.

14. The image processing method of claim 13, wherein the representation of Q is generated by reverse reading image Q.

15. The image processing method of claim 13, wherein the representation of P is generated by reverse reading image P.

16. The image processing method of claim 13, wherein the representation of Q is generated by translating image Q in terms of spatial coordinates to bring each pixel of image Q to a position corresponding to the contribution thereof to image P.

17. The image processing method of claim 13, wherein the representation of P is generated by translating image P in terms of spatial coordinates to bring each pixel of image P to a position corresponding to the contribution thereof to image Q.

18. The image processing method of claim 13, wherein the representation of Q is generated by:

reverse reading image Q;

translating reverse read image Q in terms of spatial coordinates required to bring each pixel of image Q to a position corresponding to the contribution thereof to image P.

19. The image processing method of claim 13, wherein the representation of P is generated by:

reverse reading image P;

translating reverse read image P in terms of spatial coordinates required to bring each pixel of image P to a position corresponding to the contribution thereof to image Q.

20. The image processing method of claim 13, wherein the processing function is given by $$A(x)=(P(x)-(f\times Q(-x)))/(1-f).$$

21. The image processing method of claim 13, wherein the processing function is given by $$B(x)=(Q(x)-(f\times P(-x)))/(1-f).$$

22. A document printing system, including an arrangement for mitigation for the effects of show-through in reproduction of scanned duplexed documents from a duplex scanning systems, including:

a scanner deriving a scanned first side image P from a first side image A of a duplexed document and a scanned second side image Q from a second side image B of the duplexed document, at least the first side image P including a component thereof attributable to show-through from the second side of the document, and storing images P and Q;

an image manipulation circuit generating a representation of Q corresponding to the show-through contribution to first side image P;

means for processing image P to remove show-through as a function of the representation Q, thereby deriving correct image A;

printing P, with show-through effects mitigated.

* * * * *